US005275871A

United States Patent [19]

Hambright

[11] Patent Number: 5,275,871

[45] Date of Patent: Jan. 4, 1994

[54] PARTICULATE MATTER IMAGE TRANSFER APPARATUS

[76] Inventor: Perry N. Hambright, 23515 Oxnard St., Woodland Hills, Calif. 91367

[21] Appl. No.: 803,574

[22] Filed: Dec. 9, 1991

[51] Int. Cl.[5] .............................................. B32B 3/00

[52] U.S. Cl. ...................................... 428/207; 428/40; 428/41; 428/43; 428/53; 428/54; 428/132; 428/202; 427/199; 427/202; 427/282; 156/249; 156/240; 156/241; 156/254; 156/255; 156/268

[58] Field of Search ............... 156/249, 240, 241, 254, 156/255, 268, 248, 235, 279; 427/202, 199, 282; 428/207, 327, 914, 41, 40, 43, 44, 54, 53, 132, 202

[56] References Cited

U.S. PATENT DOCUMENTS

| | | | |
|---|---|---|---|
| 2,876,575 | 3/1959 | Leika | 156/248 |
| 3,315,374 | 4/1967 | Geraty | 156/63 |
| 3,681,186 | 8/1972 | Findlay et al. | 156/247 |
| 3,897,587 | 7/1975 | Molner | 156/234 |
| 3,985,602 | 10/1976 | Stuart | 156/249 |
| 4,478,666 | 10/1984 | Ogden | 156/240 |
| 4,521,267 | 6/1985 | Jacobson | 156/249 |
| 4,655,868 | 4/1987 | Hefele | 156/249 |
| 4,770,732 | 9/1988 | Steelman | 156/249 |

*Primary Examiner*—Patrick J. Ryan
*Assistant Examiner*—Merrick Dixon
*Attorney, Agent, or Firm*—Jack C. Munro

[57] ABSTRACT

An image producing and transfer apparatus which utilizes a base sheet covered with a tacky adhesive which in turn is covered with a liner sheet composed of a plurality of individually removeable liner segments. Part of the apparatus includes a plurality of break-away members which are manufactured at the same time as the apparatus and of the same material of construction and the same die cutting process to become a tool in the method of this invention. Each break-away member includes a tacky adhesive surface which, when applied to the outer surface of one of the liner segments, facilitates the removal of that liner segment thereby exposing an area of the tacky adhesive which can now be covered with a particulate matter. All liner segments are removed in this manner. When all liner segments have been removed and the particulate matter applied, there remains a border segment. A liquid glue is coated onto the completed image of this particulate matter with some of this glue coating the border segment. This border segment is removed and thereby removes all excess glue. An exterior structure such as a woven fabric is placed onto the liquid glue. The glue is allowed to dry and the base sheet with its tacky adhesive is then peeled away from the glue impregnated particulate matter, thereby transferring the particulate matter image onto the fabric.

1 Claim, 1 Drawing Sheet

PARTICULATE MATTER IMAGE TRANSFER APPARATUS

BACKGROUND OF THE INVENTION

1) Field of the Invention

The field of this invention relates to construction of images and more particularly to the producing of an image of a desireable set of colors on an exterior structure such as a piece of fabric, a canvas or other porous material.

2) Description of Prior Art

The producing of images by individuals on exterior structures such as fabric shirts, canvasas and other similar types of structures is normally accomplished by somehow imprinting or hand drawing an outline of the desired design and then carefully coloring that outline design on the exterior structure. This type of image producing arrangement requires a certain amount of artistic skill and most people just do not have the skill necessary to produce an attractive, accurate image using that method.

A desireable way to reproduce an image is by using a colored particulate matter such as glitter, sand, sawdust and so forth. For example, different colors of glitter could be utilized in a particular pattern to produce an image such as a flower on a garment. The obvious way to produce such an image would be by applying it directly to the exterior structure, such as on the front of a shirt, using glue and dry glitter or a glitter paint. Again, such direct application requires a certain amount of artistic skill which not everyone has.

SUMMARY OF THE INVENTION

A method of making an image and an apparatus therefore which utilizes a base on which is placed a tacky adhesive which is then covered by a non-stick liner sheet with a plurality of removeable segments with these segments being arranged to form a particular image. Produced at the time and of the same material are a plurality of hand-held members that include a tacky adhesive section which is to be adhered to the outside surface of one of the removable segments and, by exerting an outward pulling force, will cause removal of that segment from the tacky adhesive layer on the base. A colored particulate matter is then to be applied to the exposed tacky adhesive area of the removed segments and to completely cover such. This procedure is to be repeated for each of the color coded, removable segments which thereby produce a desired image on the base. The image could then be transferred to an exterior surface. A liquid glue is applied to the particulate matter, overlapping onto the remaining removable segment that constitutes the outside area bordering the image. This last segment is removed as those before it, thereby removing all excess glue overlapping it, leaving wet glue only on the particulate matter image. An exterior structure is to be placed against the glue and the glue to be permitted to dry which will cause permanent adherence of the particulate matter to the exterior structure. The base with the tacky adhesive is to then be removed leaving the desired image on the exterior structure.

DETAILED DESCRIPTION OF THE SHOWN EMBODIMENT

Figure 1:
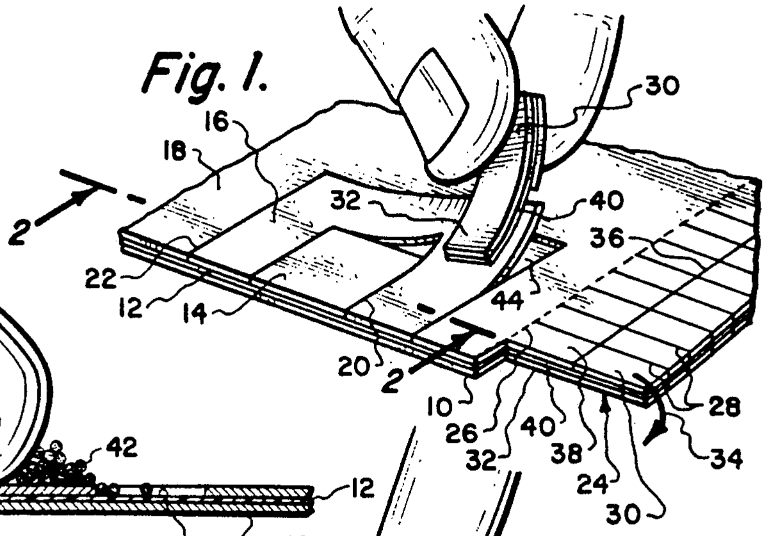
FIG. 1 is an isometric view of the image transfer apparatus of the present invention depicting its operation to remove a particular liner sheet segment leaving exposed an area of a tacky adhesive layer below it, using a concurrently produced adhesive strip as a tool.
Figure 2:
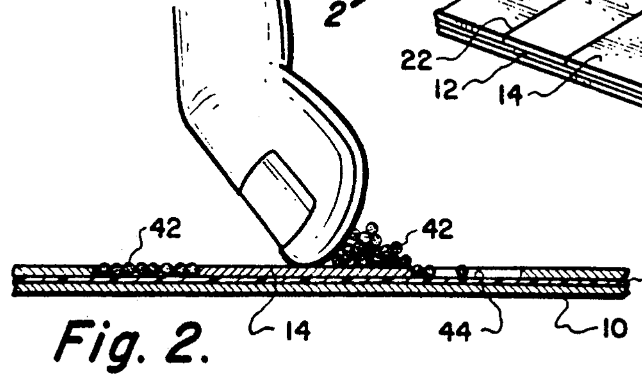
FIG. 2 is a cross-sectional view taken along line 2—2 of FIG. 1 depicting the application of a particulate matter to an area of the tacky adhesive layer which has now been exposed by the segment that has been removed.
Figure 3:
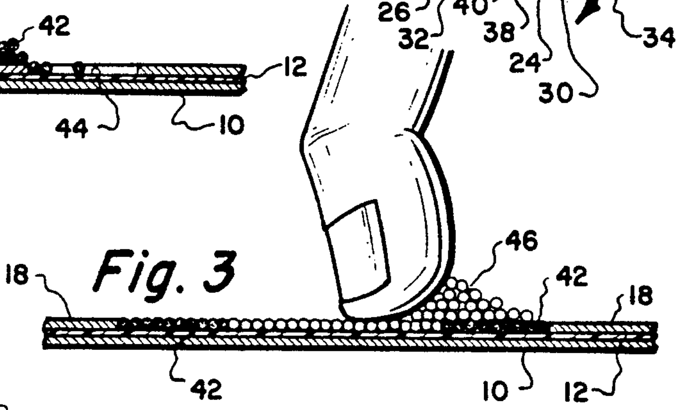
FIG. 3 is a view depicting the application of a different color of particulate matter to yet another area exposed by a liner sheet segment that has been removed.
Figure 4:
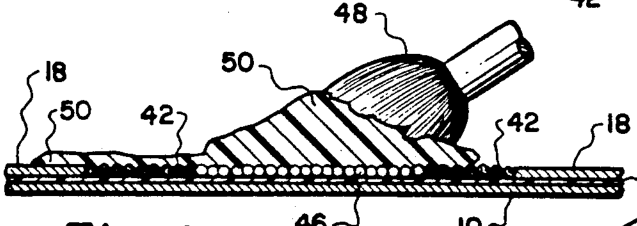
FIG. 4 is a view showing the application of a liquid glue onto the image produced by the particulate matter and overlapping onto the removable segment that borders the image.

Referring particularly to the drawing there is shown an image transfer apparatus in the form of a sheet material base 10 on which is applied completely there across a layer 12 of tacky adhesive. Normally covering the tacky adhesive 12 is a liner sheet in the form of a plurality of segments 14, 16 and 18. The segments 14, 16 and 18 are constructed of a material with a non-stick coating which can be easily removed from the tacky adhesive layer 12. Segments 14, 16 and 18 are separated from each other by a series of "kiss cuts". Kiss cutting is a form of die cutting wherein the cutting edge of the die cuts through only the thickness of the segments 14, 16 and 18 and does not cut through the tacky adhesive layer 12 with a base 10. The arrangement of the kiss-cut lines 20 and 22 form an outline design that separates the segments 14, 16 and 18. The particular design could be as for example a flower. The leaves of the flower could be one color and the petals of the flower could be one or more other colors. Imprinted on these segments 14, 16 and 18 would be indicia designated which particular color would be applied for that particular segment. This indicia is not shown in the embodiment.

In order to apply the particular desired color to the particular area, it is necessary to remove the particular segment 14 or 16. Extending transversely from the combined base 10, adhesive layer 12 and kiss cut segment 18 is an extension 24. This extension 24 is separated from the base 10 adhesive layer 12 and the segment 18 by a perforated, through-cut (as opposed to kiss-cut) line 26. Perpendicular to the perforated line 26 are a series of continuous, through-cut lines 28 dividing the extension 24 into a plurality of tabs composed of handle end 30, and working end 32. Separating each of the tabs are the continuous through-cut lines 28. This plurality of tabs could be left attached in manufacture as shown or cut away and used as a separate strip of tabs.

The operator is to grasp the handle end 30 of a particular tab and pull such sideways in the direction of arrow 34 tearing the tab away along the perforated line 26.

Separating the handle end 30 and the working end 32 is a kiss cut line 36. This kiss cut line 36 permits the liner segment 38 on the working end 32 to separate from the tab while the working end 32 is torn along perforated line 26. There is now exposed on the outer surface of the working end 32 an area 40 of tacky adhesive. The operator can then place this area 40 of tacky adhesive on the exterior surface of one of the segments 14 or 16 such as segment 16 being shown in FIG. 1. An adherance will occur between the working end 32 and the segment 16 and the operator can lift upwardly which will result in the segment 16 being easily disengagable as is clearly shown in FIG. 1 from the adhesive layer 12 on base 10. The use of the tabs composed of handle section 30 and working end 32 eliminates the need to have to dig up, with a sharp object, a corner of a segment 14 or 16 in order to position the segment so that it can be grasped and thereby removed or to bend the apparatus from the base side in order to do the same. It is to be understood that once a tab and a segment has been removed it is to be discarded. The subject matter of this invention results in the creation of a new tool for facilitating removal of the segments 14 and 16 out of the same material and using the same manufacturing process as that used for the image transfer apparatus itself.

With segment 16 now being removed, particulate matter 42 is to be applied to the tacky adhesive of area 44 which has now been exposed by the segment 16 having been removed. The particulate matter 42 is to completely cover the exposed tacky adhesive of area 44 and fully fill in the shape of area 44 as it adheres to the adhesive surface 12.

The operator now grasps another tab and again uses it similar to what is shown in FIG. 1 and places the tacky adhesive area 40 on the exterior surface of the segment 14. Upward movement of the tab will result in the segment 14 being removed and is then to be discarded. This will again expose a tacky adhesive area to which is applied and completely covered with particulate matter 46. It doesn't make any difference if particulate matter 46 comes into contact with particulate matter 42 since the tacky adhesive is now completely covered by the particulate matter 42 and therefore the particulate matter 46 will not adhere to the area where particulate matter 42 is adhered.

Figure 5:
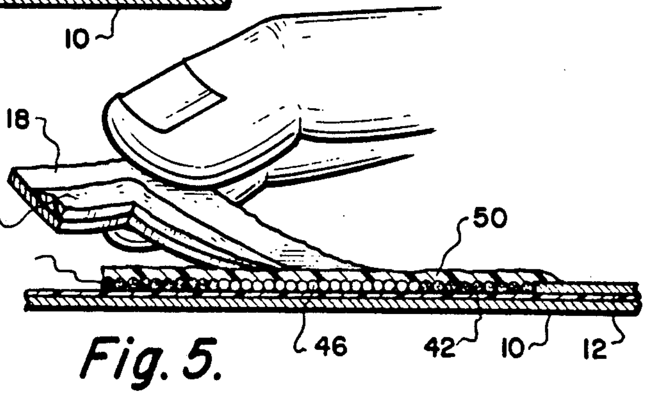
FIG. 5 is a view depicting the removing of the boarding peripheral segment of the liner sheet after the application of the glue and thereby removing the excess glue.
Figure 6:
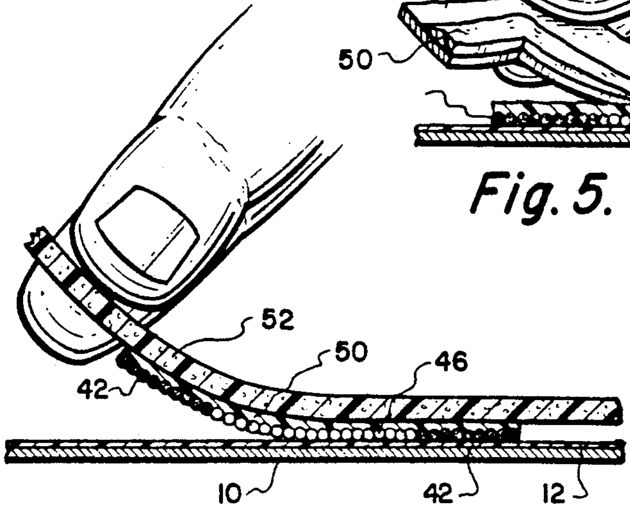
FIG. 6 is a view depicting the removal of an exterior structure, such as a woven fabric, which has been applied onto the glue and the glue has now dried, permanently adhering the particulate matter image onto the exterior structure, and this exterior structure now being removed, also removes the image from the base sheet which carries the tacky adhesive.

Let us assume now that the overall design has been created. The user then takes a brush 48 or other liquid spreading tool to which has been applied a quantity of a liquid glue 50. This glue 50 is then to be smeared and evenly coated across the entire layer of the particulate matters 42 and 46. In order to fully coat the particulate matter image, the glue 50 should overlap the image and come into contact with the segment 18 which defines the peripheral limits of the design. After the glue 50 has been applied, the segment 18 is to be removed with a tab being utilized as aforementioned if such is desired or it can be moved directly as is shown in FIG. 5. Segment 18 acts as a mask for the glue and strips away the excess glue as it is removed leaving a layer of glue only on the particulate matter image.

An exterior structure such as a layer of fabric 52 is to then be placed onto the remaining liquid glue 50. The glue 50 is then permitted to dry permanently adhering particulate matters 42 and 46 to fabric 52. At this time, the fabric 52 is then picked up and carries with it the glue 50 and the particulate matters 42 and 46, separating them from the tacky adhesive layer 12 and base 10 which are to then be discarded. The desired design has now been transferred to the fabric 52.

What is claimed is:

1. An image transfer apparatus comprising:

a solid, thin, sheet material base having an upper surface and a lower surface;

a tacky adhesive covering said upper surface;

a liner sheet placed on said tacky adhesive, said liner sheet having an inside surface and an outer surface, said liner sheet being coated on said inside surface with a non-stick substance thereby making it removable exposing said tacky adhesive;

said base having an extension, said extension comprising a plurality of break-away members, each said break-away member having a graspable handle section and a protruding end, a pick-up adhesive placed on said protruding end, said pick-up adhesive to connect with said outer surface of said liner sheet to facilitate removing of said liner sheet from said tacky adhesive and said base when a pulling force is applied away from said base;

said liner sheet being divided into several individually removable liner segments, each said liner segment being of a different size and configuration, each said liner segment being imprinted on its said outer surface with a single color identifying indicia, said liner segments being in the configuration of a particular design, said linear segments comprise in total the entire said liner sheet;

a dry solid particulate located on said tacky adhesive exposed by removal of each said removed liner segment, said particulate matter for each said removed liner segment being of a different color, said particulate matter covering said tacky adhesive for its respective said segment; and a border segment located peripherally of said liner segments, a liquid glue applied onto said particulate matter with some of said glue overlapping onto said border segment, a break-away member connects with said border portion which allows said border portions to be readily disengaged from said tacky adhesive and said base, and an exterior structure connects with said liquid glue permanently adhering said particulate matter to said exterior structure when said base is removed from said particulate matter.

* * * * *